United States Patent [19]

Kaplan

[11] Patent Number: 4,765,904
[45] Date of Patent: Aug. 23, 1988

[54] METHOD AND APPARATUS FOR EVAPORATION AND LIQUID SEPARATION

[76] Inventor: Vladimir Kaplan, 13103 Wilton Oaks Dr., Silver Spring, Md. 20906

[21] Appl. No.: 776,976

[22] Filed: Sep. 17, 1985

Related U.S. Application Data

[63] Continuation-in-part of Ser. No. 517,453, Jul. 26, 1983, abandoned.

[51] Int. Cl.⁴ ............................................. B01D 13/00
[52] U.S. Cl. ..................................... 210/637; 210/640
[58] Field of Search ................. 203/10; 159/DIG. 27, 159/DIG. 28; 210/640, 637

[56] References Cited

U.S. PATENT DOCUMENTS

| | | | |
|---|---|---|---|
| 3,332,746 | 7/1967 | Chaff et al. | 159/DIG. 27 |
| 3,355,382 | 11/1967 | Huntington | 210/640 X |
| 4,265,713 | 5/1981 | Cheng | 210/640 X |
| 4,579,662 | 4/1986 | Jonsson | 210/637 X |

FOREIGN PATENT DOCUMENTS 33543 8/1969 Australia ............................ 210/640

OTHER PUBLICATIONS

Findley, M. E., "Vaporization Through Porous Membranes", pp. 129, 130, 5-1966.

Primary Examiner—Frank Spear
Attorney, Agent, or Firm—James J. Brown

[57] ABSTRACT

A method and apparatus for evaporation and liquid separation which (1) a liquid to be treated and a carrier for evaporating molecules are maintained in contact wiht opposite sides of a thin membrane which has capillaries extending between the opposite sides of the membrane of substantially uniform size; (2) the liquid is placed in contact with one side of the membrane and enters the capillaries to a level which is separated from a second side of the membrane by a distance which is preferably less than 30% of the capillary length; (3) the diameters of the capillaries are chosen so that the evaporating substance exerts a partial pressure in the proximity of a convex capillary meniscus which is significantly higher than the corresponding partial pressure in the evaporate's carrier. Preferably the method of the invention is carried out cyclically.

10 Claims, 5 Drawing Sheets

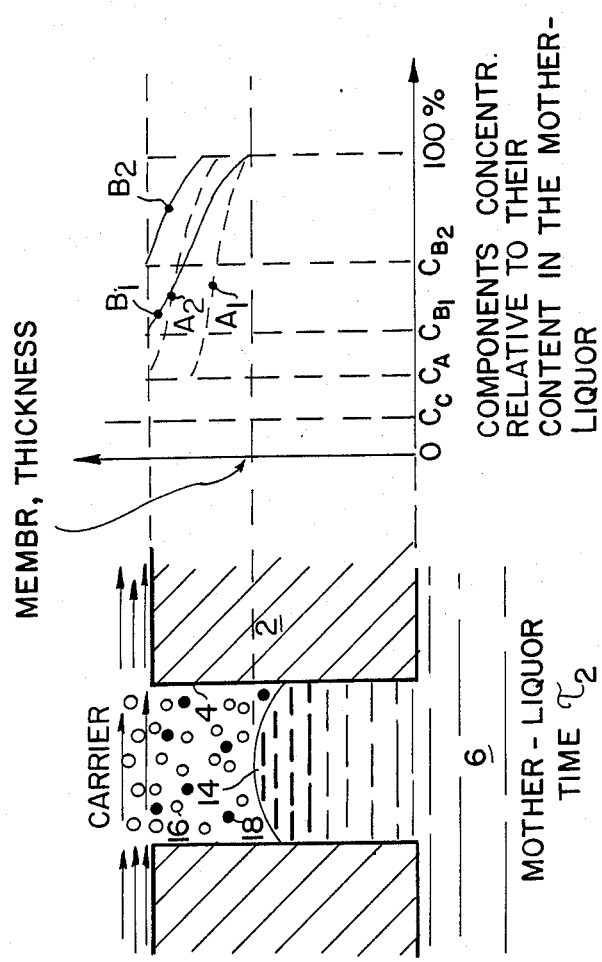
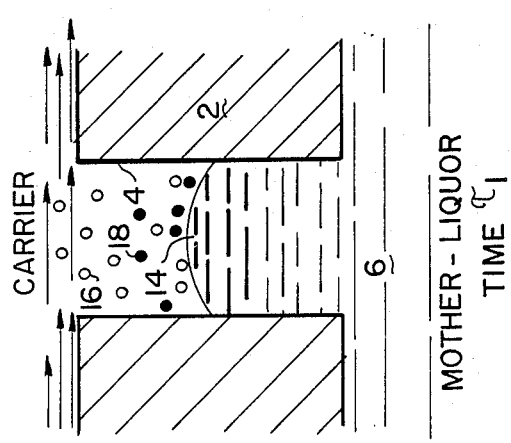
FIG. 5a
FIG. 5b
FIG. 5c

METHOD AND APPARATUS FOR EVAPORATION AND LIQUID SEPARATION

CROSS-REFERENCE TO RELATED APPLICATION

This application is a continuation-in-part of application Ser. No. 517,453 filed July 26, 1983, now abandoned.

TECHNICAL FIELD

This invention relates to the art of liquid separation and evaporation, particularly the art of employing a porous membrane to promote evaporation of a liquid and for use in separation of substances.

BACKGROUND OF THE INVENTION

Evaporation of a liquid and separation of liquid components has been investigated somewhat thoroughly. The generally accepted theory of evaporation is that the molecules of the substance are in continuous motion and are bound to each other by various molecular forces. The energy of the molecules follows a distribution, and statistical theory holds that the distribution is generally bell-shaped. Evaporation occurs when molecules having higher than average energy escape from an exposed surface of the substance when their velocity is too great to be restrained by the molecular forces. The molecules which escape from the exposed surface also have a distribution of energies and they exert a partial pressure corresponding to the physical and chemical nature of the evaporating substance and surrounding conditions such as pressure and temperature. The escaped molecules continue their motion, but being freed from the mother-liquid they are able to travel longer distances. The ability of these molecules to move in the gaseous stage is described in terms of molecular mean free path, which is the average distance between collisions. By traveling away from the liquid, the evaporated molecules build a mass transfer boundary layer where the concentration of the evaporated substance decreases rapidly with the distance from the mother-liquid.

The process of evaporation is used to carry out one or more of the following three major functions:
1. to increase the content of a certain substance in a surrounding or a passing flow (humidification);
2. to reduce the thermal energy of a given substance (cooling); and
3. to segregate components of a mixture ("liquid-liquid" separation).

Processes of humidification and evaporative cooling deal basically with water as the substance to be evaporated. Evaporative separation is widely used in the process of distillation. According to this process, substances having different boiling points may be separated by the process of evaporation since the substance having a lower boiling point, i.e., being more volatile, will evaporate at a much higher rate. A problem arises when at some point during distillation the components in the mixture arrive at a concentration which can not be changed by distillation, and distillation of this mixture results in production of a gaseous substance having components in the same proportions as that of the liquid mixture. Such a mixture is known as an azeotropic substance.

Membranes which permit selective diffusion of materials are also known. These membranes rely upon chemical transmission of a solvent through a semi-permeable membrane. When pressure is applied to liquid on the side of the membrane having a higher solute concentration, the flow of liquid may be stopped. The amount of pressure necessary to stop the flow of liquid is known as the osmotic pressure.

It is also known that gases and liquids will diffuse through a perforated material. These materials typically have a microporous structure, the diameter of the pores being on the order of one to several hundred microns.

A phenomenon of porous evaporation is known wherein a remarkable increase in mass transfer is obtained when a liquid is forced through a sintered metallic or ceramic plate having microcapillaries. The liquid is brought to the evaporative surface, and a spurt of evaporating molecules diminishes the laminer underlayer of the evaporate's carrier flow. The mass transfer coefficient in such a device is tens of times higher than that from a flat, open liquid surface. Unfortunately, the sintered plates used in such applications suffer from two major drawbacks. First, it is almost impossible to provide a device of reasonable size yet having a large mass transferring surface. Second, a high pressure is required to bring the liquid to the surface through a plate which is at least one-eighth inch thick.

It is an object of this invention to provide a method and apparatus to promote evaporation of a substance through a porous membrane.

It is a further object of this invention to provide a method and apparatus for causing a substance to be evaporated to enter the pores of a porous membrane so that the distance between the substance and an opposite side of the membrane is less than the thickness of the membrane.

It is a further object of this invention to provide a method and apparatus for easily separating the components of a mixture, especially an azeotropic one.

DISCUSSION OF PRIOR ART

U.S. Pat. No. 4,265,713 (Ching) teaches a composite membrane which may be used for distillation. The composite membrane comprises a first thin lyophobic microporous layer, a second thin lyophilic layer. Evaporation takes place within the lyophobic membrane, and the lyophilic membrane prevents the intrusion of the distillant into the pores of the lyophobic layer. The lyophilic layer is adjacent the distillant while the lyophobic layer is adjacent the distillate. This apparatus prevents a condition known as water-logging when the membrane is used in the desalination of salt water. The preferred hydrophobic material is polytetrafluoroethylene having a mean pore size of less than 0.5 micron.

U.S. Pat. No. 3,651,618 (Klein) teaches the use of a sintered, lyophobic synthetic material for separation of fluids. The size of the pores is preferably 5 to 200 microns, and diffusion takes place across the surface of the membrane. The distinguishing feature of the process disclosed in this patent is that the separation is initiated from the membrane-liquid interface area, i.e., the escaped molecules must overcome the entire thickness of the membrane before they reach its opposite side.

U.S. Pat. No. 3,405,058 (Miller) is directed to a process and apparatus for purifying water by forcing it through a filter in the vapor state using a hydrophobic membrane which prevents liquid water from entering the pores.

U.S. Pat. No. 4,118,285 (Yeh) describes a method and apparatus for separating a mixture of liquids having different volatilities. According to the Yeh patent, liquid is vaporized by boiling and condensed to a liquid state on the lower surface of a porous plate. The condensed liquid is then transferred by capillary suction to the other side of the plate.

U.S. Pat. No. 3,846,295 (Gibbs) describes a method and apparatus for use in water purification which employs reverse osmosis to force water through a water permeable membrane to arrive at the other side in the liquid state.

U.S. Pat. No. 2,953,502 (Binning et al) describes a method for separating azeotropic mixture using a combination of procedures which include permeation of a portion of the azeotropic mixture through a non-porous plastic membrane followed by distillation of at least a portion of the permeated fraction.

SUMMARY OF THE INVENTION

In the present invention, the phenomenon of porous evaporation is combined with a membrane-separation technique to produce a qualitatively new process which has several distinct advantages. First, it enables a large heat and mass transferring area to be incorporated into a compact device. Second, it allows previously known evaporative and liquid separation processes which operate at the boiling point of the liquid to be replaced by process requiring only low levels of energy. Third, it provides an energy-efficient method for liquid separation including separation of an azeotropic substance. Fourth, it provides a technique for increasing the efficiency of various heat-consuming systems such as air conditioners and dryers.

The present invention is a method and apparatus for employing a porous membrane to increase the rate of evaporation of a substance, and to facilitate separation of one substance from another.

According to the invention, a substance which is to be evaporated is placed cyclically in contact with a first side of a porous membrane so that evaporation will take place through the pores and the evaporated molecules will reach the opposite, second, side of the membrane. In accordance with one embodiment of the invention, pressure is applied to the substance to force it at least about 70% into the pores so that the distance between the top of the substance in the pore and the other side of the membrane becomes significantly less than the thickness of the membrane. Thus, the molecules which escape from the surface of the substance in the pores travel a very short remaining distance of the pore and escape to the opposite side of the membrane thereby entering a space where they can be picked up by the evaporate's carrier. Where very thin porous membranes are used, it is not necessary for the liquid substance to actually enter the pores of the membrane and consequently, the application of pressure is not necessary.

In addition, the diameter of the pores is chosen so that the capillary pressure increases the vapor pressure of the substance so that it is greater than the partial pressure of the substance in the absence of the curved surface inherent in small capillaries.

In addition to increasing the rate of evaporation and efficiency of separation of components of a substance, the method and apparatus of the invention are particularly useful for separation of substances, especially in an azeotropic mixture. In accordance with the invention, when the molecular mean free paths of the substances of the azeotropic mixture are different, separation is facilitated by causing the mixture to enter the pores of the porous membrane to allow the substance having a greater molecular mean free path to evaporate preferentially with respect to the substance having a smaller molecular mean free path. Evaporation of the substance having the shorter molecular mean free path is substantially reduced by providing a membrane having a thickness such that the distance from the top of the substance in the pore to the second surface of the membrane is at least greater than the shorter molecular mean free path.

BRIEF DESCRIPTION OF THE DRAWINGS

FIGS. 5a, 5b and 5c are graphical illustrations showing change in concentration of two components during liquid separation in accordance with the invention.

DETAILED DESCRIPTION OF THE INVENTION

Figure 1:
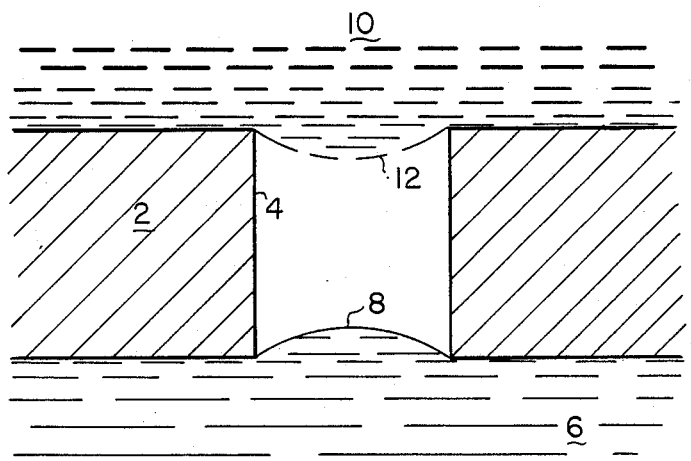
FIG. 1 is a diagram showing separation in accordance with prior art.

FIG. 1 is a known method of evaporation through a porous membrane. A membrane 2 has a plurality of pores 4. The membrane is a known sintered material, for example sintered polytetrafluoroethylene. A substance containing components to be separated 6 is located on one side of the membrane 2, and a meniscus 8 is formed in the pore 4. Molecules having enough energy to escape the substance 6 travel through the pore 4 and exit at the other side of the membrane. A substance 10 is placed on the second side of the membrane and forms a meniscus 12 if it is a liquid. Substance 10 may be a gaseous carrier for the evaporated molecules, in which case the meniscus 12 will not be formed. The liquid substance 6 does not enter the pore 4 and the distance which an evaporating molecule must travel substantially affects the efficiency of the prior art method since only a limited portion of the molecules is able to reach the second side of the membrane 2. Moreover, the cross-section of the pore 4, or capillary does not enhance, or even facilitate, the mass transfer because most prior art methods provide liquid bodies on both sides of the membrane. Thus, the effect of capillary pressure is nullified.

Carrier 10 is placed on the second side of the membrane, and it picks up the evaporated molecules at a rate proportional to the difference between the concentration of the evaporate's molecules in the exiting cross section and in the carrier flow.

Figure 2:
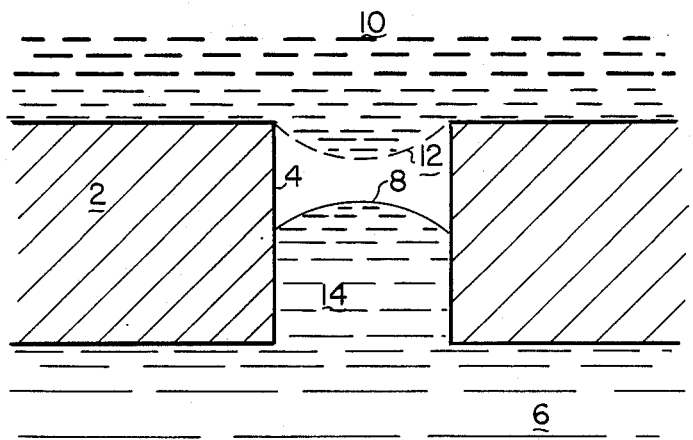
FIG. 2 is a diagram showing evaporation in accordance with the invention.

FIG. 2 is an illustration of evaporation in accordance with the present invention. The membrane 2 has pores 4 as shown in FIG. 1. The substance 6 is brought in contact with the membrane and, as shown in FIG. 2, is placed under pressure so that a column 14 of the substance 6 enters the pore 4. A meniscus 8 is formed as shown in FIG. 1 due to the interaction of the substance 6 with the material of the membrane 2. In accordance with the invention, column 14 brings the substance to be treated closer to the second side of the membrane, thus reducing the travelling distance for the molecules which escape the surface 8. It should be noted that the pressure applied to the substance 6 is not enough to force the substance completely through the pores 4 of the membrane, but rather is sufficient only to provide a column 14 which extends, at least about 70% into the pore 4.

Figure 3:
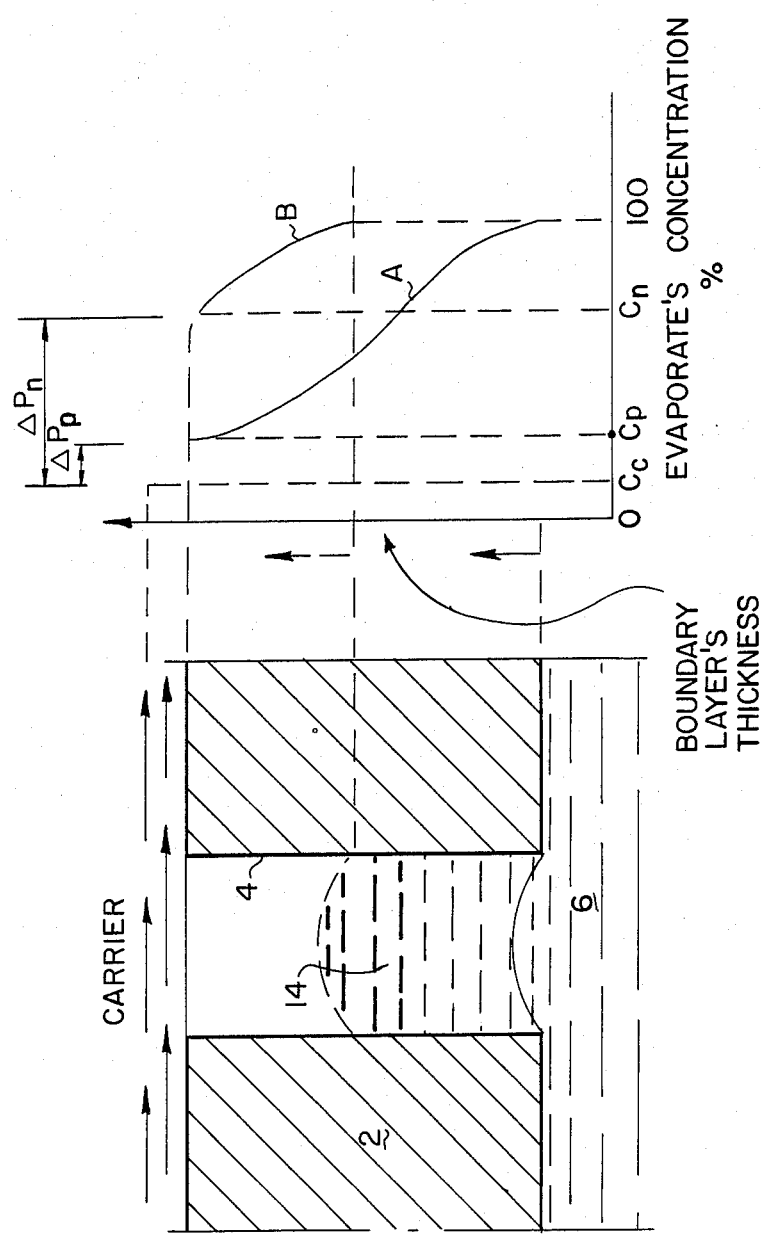
FIG. 3 is a diagram and graph illustrating the principle of the invention.
Figure 4:
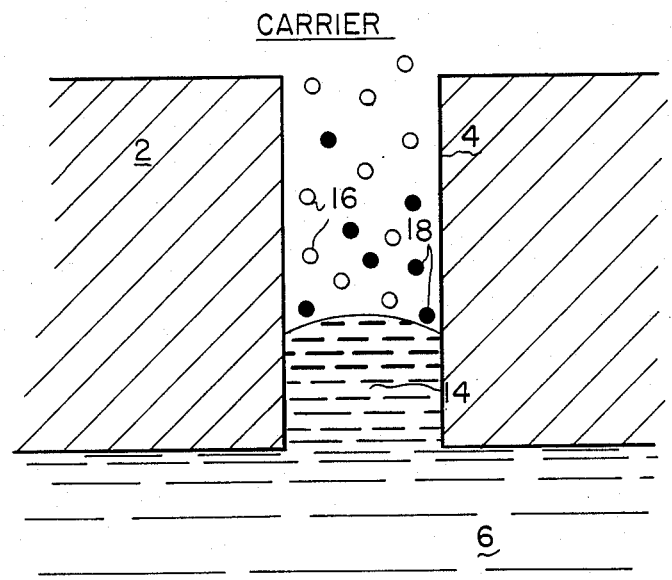
FIG. 4 is a diagram showing distillation of an azeotropic mixture in accordance with the invention.

The method shown in FIG. 2 increases the rate of evaporation markedly, and FIG. 3 is a graphical illustration of the effect of pressurizing the evaporating substance in the pores.

Evaporating molecules create a concentration profile known as mass-transfer boundary layer inside the pore 4. The portion at the left in FIG. 3 shows a column 14 of a substance in a pore 4. The portion at the right shows typical shapes of concentration profiles for the prior art and for the invention.

The vertical axis of the graph on the right is the thickness of the boundary layer. This axis is aligned with the figure on the left so that the distance along the vertical axis is the same as the distance along pore 4. The prior art concentration is shown by curve A, and that of the invention by curve B. $C_c$ represents the concentration of the evaporate in the carrier flow on the second side of the membrane. For simplicity, no profile of the carrier has been illustrated; $C_p$ is the concentration in the pores' exits according to the prior art, and $C_n$ is the concentration in the pores' exits in the inventive method. The driving force of evaporation, the partial pressure difference is proportional to corresponding concentrations. Thus, $\Delta P_p$ is determined by the difference between $C_p$ and $C_c$ and $\Delta P_n$ by the difference between $C_n$ and $C_c$. As it is illustrated by FIG. 3, $\Delta P_n$ is significantly greater than $\Delta P_p$.

FIG. 4 illustrates how the method of the invention may be used to separate components of an azeotropic mixture when pressure applied to the mixture. The substance 6 is pressurized to force some of the substance into pore 4, thus causing a column 14 to be produced in the pore 4. A column 14 is at a height of at least about 70% of the pore length such that molecules of one of the components will escape to the other side of the membrane in a much greater proportion than molecules of the second component. The molecules which escape are illustrated by open circles 16, and in accordance with the explanation above, they have a mean free path greater than the mean free path of the molecules of the second component which are illustrated by shaded dots 18. The latter do not escape, or escape to a lower extent, and thus do not evaporate substantially.

It will thus be appreciated that separation of the components of the azeotropic mixture 6 will be easily accomplished since these components typically have different molecular mean free paths.

The distance between the top of column 14 (FIG. 3) and the second surface of the membrane plays a crucial role in the separation process. Applying the boundary layer concept to a mixture of two components, development of two concentration profiles is expected in pore 4, one for each component. In FIG. 5c, the two profiles are shown; the dotted and solid lines describe the location of the boundary layer for component A and component B, respectively, assuming that the molecular mean free path of component A is smaller than for component B. Subscripts 1 and 2 are related to the timing of the process. At time $T_1$, in FIG. 5a, molecules of component A which is represented by shaded circles are contained within the space between the second side of the membrane 2 and the meniscus of the column 14. As for components B, its molecules represented by open circles 16 are able to reach the carrier flow due to the fact that they have greater molecular mean free paths. In FIG. 5c, profiles $A_1$ and $B_1$ represent the mass transfer conditions at this point. At time $T_2$, in FIG. 5b, molecules of component A approach the second side of membrane 2 and molecules of component B continue to enrich the carrier flow. In FIG. 5c, lines $A_2$ and $B_2$ reflect the concentration profiles at this point. If the process continues beyond time $T_2$, A-molecules will start to evaporate, thus contaminating component B in the carrier flow. At this point, it is preferable to switch to another "fresh" membrane where the separation can be restored to a state similar to the one shown on FIG. 5a. Therefore, it is preferred to carry out the process in an oscillating mode. Depending on the nature of the components in the mixture, required purirty, pressure and temperature conditions and pore size of the membrane the period of oscillation can be varied from ten seconds to five minutes. The same factors determine the location of the meniscus in the membrane's pores. The distance between the top of column in the pores and the second or top surface of the membrane should be less than 30% of the thickness of the membrane.

The required pressure applied to the mother-liquid depends upon the temperature of the substance, and it is possible to raise or lower the temperature of the substance 6 in accordance with the feasible pressures and the thickness of the porous membrane 2.

The size of the capillaries must be such that the capillary pressure is 20 to 60 percent of the maximum capillary pressure. The maximum capillary pressure is determined by the following relationship:

$$P_c = 2\frac{\sigma}{r} \cdot \frac{\rho v}{\rho e}$$

where $P_c$ is the capillary pressure, $\sigma$ is the surface tension, $\rho v$ is the density of the evaporate in the gaseous phase, $\rho c$ is the density of the liquid, and r is the radius of the capillary defined as a minimum radius of a cylindrical channel containing 5 to 7 molecules of the evaporate compactly packed in the channel cross section.

The separation of the components of an azeotropic mixture can be effected by using two adjacent membranes in series wherein the diameters of the pores 4 are different. This technique may provide energy efficiency.

The evaporate's carrier located on the second side of the membrane can be either stationary or flowing. Thus the separation process can be accomplished in either a continuously flowing embodiment or in a batch procedure having one or more sequential steps. An apparatus for effecting separation in accordance with the invention is shown in FIG. 6. A feed line 20 directes the mixture that is being treated to a control valve 22 which directs the substance to either of the chambers 24 and 26 through conduits 28. Each of the chambers 24 and 26 is separated into a first portion 32 and a second portion 30 by the membrane 2. A carrier for the distillate is introduced to the portions 30 at 34, is passed through the portions 30, and exits at 36 after picking up the evaporated molecules. The partial pressure of the evaporated substance at 34 depends on the "vapor-liquid" equilibrium conditions. For example, when water is separated from a mixture, the dew point in the carrier can be as low as −40 to −60 degrees Fahrenheit and even less in order to achieve a high purity in the remainder.

A valve 38 controls the outlet of the chambers 30 and drain valves 40 and 42 also control the passage of fluid from the chambers 32 into a collection reservoir 44.

Figure 7:
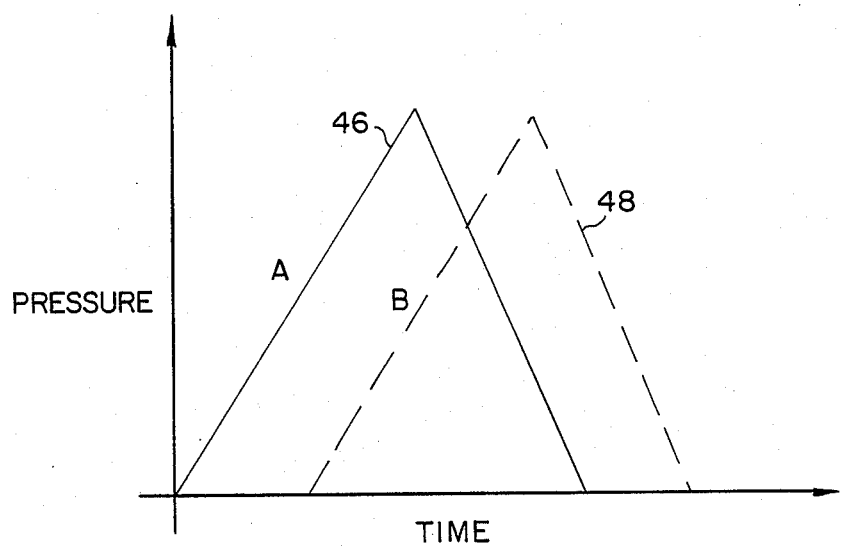
FIG. 7 is a graphical illustration of pressure variations used with the apparatus of FIG. 5.
Figure 6:
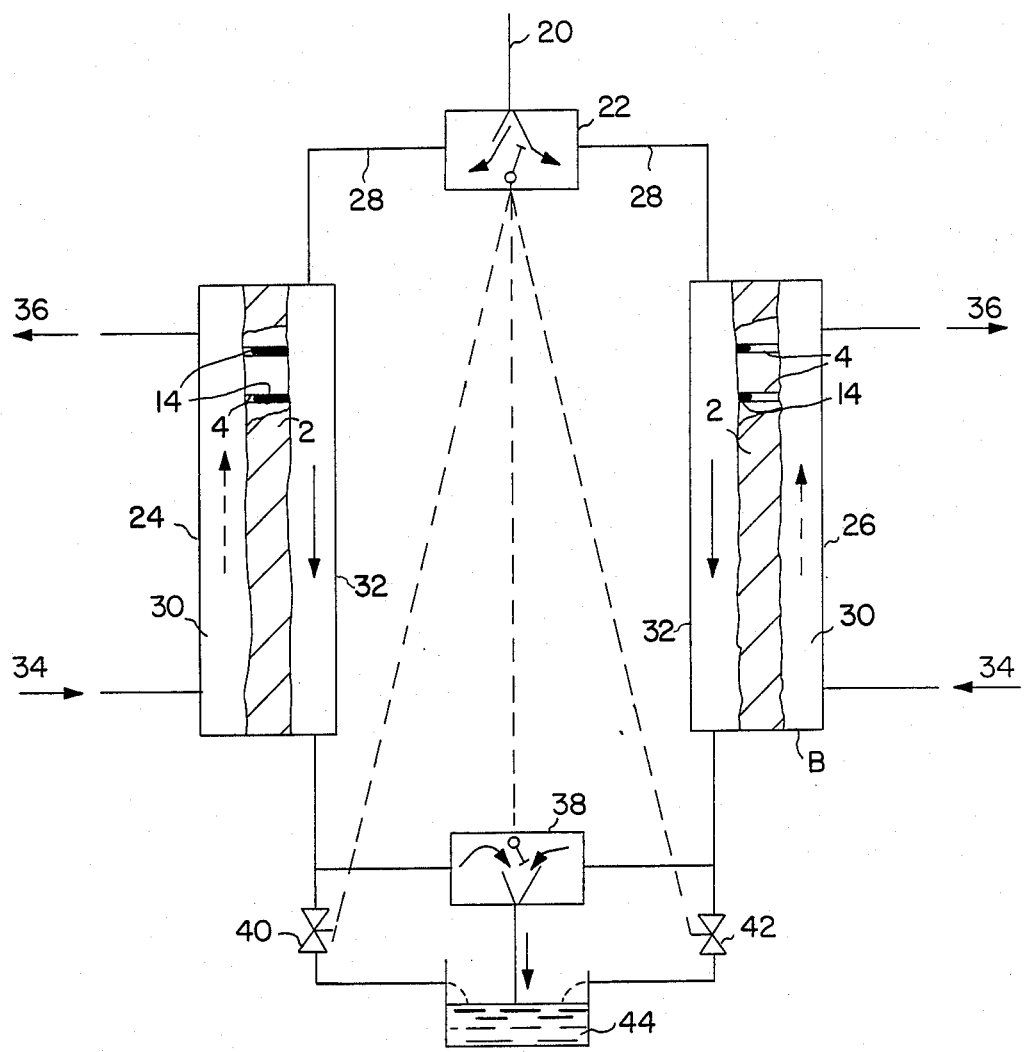
FIG. 6 is a schematic diagram of an apparatus in accordance with the invention.

The operation of the apparatus shown in FIG. 6 may be described with respect to the graph shown in FIG. 7 wherein the horizontal axis represents time and the vertical axis represents the pressure across the membrane 2 in each of the chambers 24 and 26. Line 46 represents the pressure, for example, in chamber 24, and a line 48 represents the pressure, for example, chamber 26. It will be seen that the pressure in each of the chambers increases cyclically in accordance with the opening and closing of the valves 22, 38, 40 and 42. These valves are connected together as shown by the dashed lines in FIG. 6 so that the operation is automatic.

Fluid is first admitted to chamber 24 through valve 22. Valve 38 begins to open with a short delay (2–3 seconds) in order to begin building liquid column 14. Pressure increases in accordance with the line 46 until the height of the column in the pores 4 is as desired. The pressure may remain for any desired time to allow evaporation to take place. Then, the valves 22 and 38 start to change so as to admit substance to the chamber 26 to increase the pressure there to permit evaporation in accordance with the principles of the invention. Simultaneously, the pressure in portion 32 of the chamber 24 is gradually decreasing. This pressure decrease stops the molecules of the remainder from entering the evaporate's carrier. When the liquid flow is totally cut off from chamber 24, drain valve 40 opens to allow the residual substance to drain from this chamber 24. Pressure from the carrier on the second side of the membrane forces the residual fluid out of the pores 4 when pressure in the chamber 2, is released. Then, the cycle repeats.

The oscillating, or cyclic, mode of separation prevents seizure of the separation which can occur when the mass transfer boundary layer of the remaining liquid starts to occupy the entire height between the pore's meniscus and the second side of the membrane.

I claim:

1. A method for promoting separation from a liquid azeotropic mixture comprising two or more liquid components in a unitary porous lyophobic membrane having a plurality of pores of substantially uniform size which form passages through said membrane, comprising placing said azeotropic mixture in contact with one surface of the membrane so that the vaporized molecules of said mxiture having the greater molecular mean free path in said pores pass in the vapor state from the surface of the said mixture through said pores to the surface of the other side of the membrane where said vaporized molecules are evacuated; said mixture being brought into contact with the first side of the membrane cyclically at periods of oscillation of flow from 10 seconds to 5 minutes so that the said mixture remaining in said pores is alternately forced back out of said pores by pressure applied from said surface of the other side of the membrane.

2. The method of claim 1 wherein pressure is applied to the liquid substance to force it to enter the said pores so that the distance between the top of the liquid mixture in the pores and said surface of the other side of the membrane is less than 30% of the thickness of the membrane, thereby promoting evaporation of said liquid from said surface of the other side.

3. The method of claim 2 wherein the dimension of said pores, in a plane parallel to said first surface, is such that the partial pressure exerted by the evaporated molecules of said first substance is amplified by capillary pressure.

4. The method of claim 1 wherein said substances can not be separated by means of distillation but wherein the molecular mean free path of the molecules of one component of said liquid substance is greater than the molecular mean free path of a second component of said substance, whereby said components are separated by the evaporation of one of said liquid components through said membrane.

5. The method of claim 4 wherein said components of said substances have substantially equal boiling points.

6. The method of claim 1 comprising the step of controlling the temperature of said liquid substance to affect the rate of evaporation.

7. Apparatus for effecting evaporation of a liquid substance comprising an azeotropic mixture of liquid components comprising a chamber divided into first and second portions by a porous membrane, said first chamber being adapted to receive said substance, means for separating said components of the azeotropic mixture and for applying pressure to said substance such that a portion of said substance in the liquid stage enters a plurality of pores which form passages through said porous membrane so that the distance between the top of the liquid substance in said pores and a surface of said material contiguous to said second portion is less than 30% of the thickness of the membrane, thereby promoting evaporation of said liquid from said surface of the other side.

8. The apparatus of claim 7 wherein the introduction of said substance into said first portion is controlled by an inlet valve and an outlet valve, and wherein said pressure increases and decreases cyclically.

9. The apparatus of claim 8 comprising a plurality of said chambers connected to inlet and outlet means in parallel, whereby the pressure is increased in at least one of said chambers while pressure is decreased in at least one of the other of said chambers.

10. A method for promoting component separation from an azeotropic liquid mixture of two or more components having different mean molecular free paths comprising:
(1) providing a thin unitary porous membrane having a plurality of pores of substantially uniform size which form passages from the first side of the membrane to the second side;
(2) placing said liquid mixture cyclically in contact with said first surface of said membrane and effecting vaporization thereof so that the vaporized molecules of said components having the greater mean molecule free path migrate preferentially to the second side thereby promoting separation of said molecules having greater mean molecular free paths from those with lower mean molecular free paths;
(3) maintaining the duration of said contact for a period of time within which time the composition of the vaporized molecules passing to said second surface remains within a specific range;
(4) evacuating the separated component of said mixture from said second side of the membrane; and
(5) discontinuing the contact between said mixture and said first surface of membrane following said contact period, and removing the components of said mixture from said pores during the period of time when said contact is discontinued, and repeating steps 2 through 5.

* * * * *